United States Patent Office 3,220,967
Patented Nov. 30, 1965

3,220,967
AQUEOUS COMPOSITIONS OF ALKALI-SOLUBLE VINYL ESTER COPOLYMERS
Herbert Terry, Springfield, and Robert V. De Shay, East Longmeadow, Mass., assignors, by mesne assignments, to Monsanto Company, a corporation of Delaware
No Drawing. Filed Mar. 28, 1960, Ser. No. 17,771
2 Claims. (Cl. 260—29.6)

This invention pertains to aqueous compositions containing a binder comprising an alkali-soluble vinyl ester copolymer and also containing a water-soluble polymer. More particularly, this invention pertains to aqueous solutions containing a mixture of the alkali-soluble vinyl ester copolymer and the water-soluble polymer having particular suitability as coating compositions and adhesives.

It is known tho employ various liquid compositions containing resinous binders in solution form as surface conditioners for the adhesion of paint to dirty, chalking or crumbly surfaces. The function of the surface conditioner is primarily to bind loose matter in or on the surface and thereby promote the adhesion of a paint film subsequently applied to the conditioner treated surface. One type of known surface conditioner which generally achieves the effect described, comprises a volatile organic liquid solution of an oleoresinous binder. The oleoresinous compositions have the disadvantage of being slow-drying, restricted to organic solvent thinning and the dried films obtained therefrom are non-breathing to water vapor. The organic solvent constituent of the composition also presents a toxicity and flammability hazard in the preparation of and use of the composition. The other type of known surface conditioner avoids these disadvantages and comprises an aqueous solution of a water-soluble resinous binder. For example, it is known to employ an aqueous solution of the alkali water-soluble copolymers of vinyl acetate-crotonic acid as a surface conditioner. Aqueous surface conditioners also permit the water cleaning of brushes, rollers and such other coating devices used to apply the surface conditioner.

While aqueous surface conditioners have been found commercially acceptable over lightly chalked surfaces, the known compositions do not provide sufficient penetration for heavy chalk dirt or old cement paint layers, so as to achieve satisfactory adhesion of a paint film later applied thereto. This problem has become even more important with the increased use of the well known latex and emulsion paints for exterior surfaces, which type paints possess critical adhesive characteristics for certain substrate materials. An aqueous composition which would promote the adhesion of latex and emulsion type paint to all substrates including those in poor condition would therefore promote the greater utility of these paints.

The applicants have discovered that particular aqueous solutions comprising an alkali-soluble copolymer of a vinyl ester with a carboxyl containing monomer copolymerizable therewith and also containing a low viscosity water-soluble polymer have all the above desirable properties. In addition to these advantages, the compositions of the present invention surprisingly have a shelf life of one year or more under normal storage conditions, which represents great improvement over the known aqueous alkali-soluble copolymer compositions. The present compositions comprise aqueous alkaline solutions containing 5–20% of an admixture comprising 50–90% by weight of the admixture of the alkali-soluble copolymer of a vinyl ester with a carboxyl containing monomer copolymerizable therewith and 10–50% by weight of the admixture of the low viscosity water-soluble polymer.

The invention may be practiced in its preferred embodiment as described in the following examples and subsequent discussions thereon but it not limited thereto. Where parts and percentages are used hereinafter in the specification and claims, they are parts and percentages by weight unless otherwise specified.

EXAMPLE 1

Into a suitable vessel equipped with means for agitation and heating was added a diluted ammonia solution comprising 1.2 parts of a 29% aqueous ammonia solution and 83.4 parts water. The solution was heated to approximately 150° F. and thereafter 12 parts of a copolymer of vinyl acetate-crotonic acid comprising 97% by weight vinyl acetate-3% crotonic acid (made according to Example 6, U.S.P. 2,263,598) was dissolved therein with agitation. While still maintaining the ammonia solution containing the dissolved vinyl ester copolymer at approximately 150° F. and continuing the agitation, 3.4 parts of polyvinyl alcohol (98½–100% hydrolysis, 4–6 centipoise viscosity for a 4% aqueous solution at 20° C.) were added. The final solution was allowed to cool to room temperature and the pH adjusted to a value of 8–8.5.

To illustrate the improvements obtained with the present compositions, the depth of penetration into a masonry coating was measured for the above composition and compared to the results obtained from a like measurement for the same composition as Example 1, but not containing the polyvinyl alcohol. Test samples were prepared from films of a cement paint coating approximately 50 mils in thickness which had been applied on glass plates and allowed to dry over night at ambient room conditions. The surface conditioner compositions described above were then brush applied to the cement paint film and allowed to dry at ambient room conditions for 16 hours. After drying, strips of masking tape approximately ½ inch wide were applied to the surface and the entire film of conditioner treated cement paint film removed from the glass plate by scoring around the edge of the tape. The free films were then washed in water at room temperature to remove any cement paint film that was not bound by the surface conditioner. The degree of penetration was determined by measuring the thickness of the washed film with a micrometer and corrected for the thickness of the tape. Whereas the composition of Example 1 penetrated to a depth of 30 mils, the composition not containing the polyvinyl alcohol penetrated only to a depth of 23 mils, indicating greatly improved penetration for the present compositions.

EXAMPLE 2

A coating composition was prepared according to the method of Example 1 having the following formulation:

| | Parts |
|---|---|
| Vinyl ester copolymer (Example 1) | 5.0 |
| Polyvinyl alcohol (99–100% hydrolysis, 55–65 centipoise viscosity for a 4% aqueous solution at 20° C. | 1.7 |
| Ammonia (29% aqueous solution) | 0.5 |
| Water | 92.8 |
| | 100 |

The films obtained from the above composition exhibited a depth of penetration comparable to that obtained with the composition of Example 1.

EXAMPLE 3

A coating composition was prepared according to the method described in Example 1, having the following formulation:

| | Parts |
|---|---|
| Copolymer vinyl acetate-monobutyl maleate comprising 85% by weight vinyl acetate-15% by weight monobutyl maleate (made according to the method of Example 1, U.S.P. 2,643,245) | 10 |
| Polyvinyl alcohol (86-89% hydrolysis, 21-25 centipoise viscosity for a 4% aqueous solution at 20° C.) | 5 |
| Ammonia (29% aqueous solution) | 1 |
| Water | 84 |
| | 100 |

To illustrate the improved storage stability for the present compositions, the shelf life for the above composition was longer than one year compared to a 3-6 months' shelf life for the same composition not containing the polyvinyl alcohol.

EXAMPLE 4

A surface coating composition was prepared according to the method of Example 1, having the following formulation:

| | Parts |
|---|---|
| 55% solids aqueous emulsion of vinyl acetate-crotonic acid copolymer of Example 1 (made according to the method of Example 1, U.S.P. 2,611,754) | 24 |
| Polyvinyl alcohol (72-77% hydrolysis, 2-3 centipoises viscosity for a 4% aqueous solution at 20° C.) | 3.4 |
| Ammonia | 1.2 |
| Water | 71.4 |
| | 100 |

EXAMPLE 5

To illustrate the further improved properties which may be obtained in the compositions of the present invention containing other optional ingredients, a coating composition was prepared having the following formulation:

*Part 1*

| | Parts |
|---|---|
| Water | 60 |
| Hexylene glycol | 30 |
| Vinyl ester copolymer (Example 1) | 20 |
| Aqueous ammonia (2.5% solution) | 11 |

*Part 2*

| | |
|---|---|
| Water | 104 |
| Polyvinyl alcohol (Example 1) | 6 |
| Wetting agent (sodium sulphate derivative of 7-ethyl-2-methyl,4-undecanol) | 3 |
| Dibutyl phthalate | 3 |
| | 237 |

A solution was prepared from the hexylene glycol and water in Part 1, then heated to approximately 150°% F. To this solution was added the aqueous ammonia solution. With continued heating, the vinyl ester copolymer was added with agitation until dissolved, whereupon the solution of Part 1 was then cooled to room temperature. In separate mixing equipment the water of Part 2 was heated to approximately 195° F., whereupon the polyvinyl alcohol was added thereto with agitation until dissolved. The solution containing the polyvinyl alcohol was next cooled and to it was added a premixture consisting of the wetting agent and the dibutyl phthalate plasticizer. Finally, the solutions of Part 1 and Part 2 were mixed and the final pH adjusted to 8-8.5. The tests described hereinafter were performed to demonstrate the improved properties for the above composition both as a surface conditioner and as a protective coating generally. The description of the tests and the results obtained, along with like test results for commercial oleoresinous compositions are as follows:

TEST 1

Cured cement discs, ¼ inch thick by 3½ inch diameter, were prepared from a mortar mix of cement, 40 mesh sand and lime in the proportions 1 to 3 to 0.5 respectively. One coat of a commercial cement paint was brushed on the cement discs and after drying 16 hours, the cement paint surface was treated with various surface conditioner compositions. After a drying period of 16 hours for the composition of Example 5 and a drying period of one week for the two different oleoresinous conditioners tested for comparison, a coat of polyvinyl acetate emulsion exterior white paint was applied. After an added drying period of 3 days for the emulsion paint film, the discs were subjected to the following test cycles: 1 hour water-soaked at room temperature followed by 1 hour in a cold cabinet at 5° F. followed by 1 hour thaw at room temperature. Both oleoresinous conditioners tested are commercially available alkyd resin base products.

*Results of Test 1.*—One oleoresinous conditioner had poor dry and wet adhesion in 1 cycle and showed blisters in 3 cycles. The other oleoresinous conditioner displayed poor dry and wet adhesion in 1 cycle, blistered in 3 cycles and after 4 cycles, the entire film of conditioner together with the cement paint base coat was removed from the cement disc. The sample treated with the composition of Example 5 was unaffected after 5 cycles illustrating first, excellent bonding of both the surface conditioner to the cement disc and second, the excellent bonding of the emulsion paint film to the surface conditioner film.

TEST 2

The effect of the aqueous conditioner of Example 5 upon repainting chalked wood surfaces is apparent from the results of the present test. A top quality self-cleaning white paint was applied to white pine panels and the panels aged in a standard Atlas Weather-Ometer until an ASTM D659-44-1944 chalk reading of 4 was obtained. The panels were then treated as follows:

| | Treatment |
|---|---|
| Panel 1 | Composition of Example 5 overcoated with polyvinyl acetate exterior white paint. |
| Panel 2 | Control (not containing any surface-conditioner). |
| Panel 3 | Equi-volume mixture of polyvinyl acetate emulsion exterior white paint with composition of Example 5. |

After 24 hours' drying, the panels were subjected to a cycle consisting of 18 hours accelerated weathering in the Weather-Ometer, removal 1 hour water soak and finally 16 hours' exposure in a cold cabinet of 5° F. The accelerated weathering cycle in the Weather-Ometer consisted of 102 minutes ultraviolet light and 18 minutes' water spray plus ultraviolet light. Black panel temperature for the test was 145° F. and relative humidity 50%.

*Results of Test 2.*—Panels 1 and 3 withstood 5 cycles without any sign of failure. Panel 2 showed cracking and film failure after 3 cycles.

The products of the present invention are aqueous alkaline solutions comprising from 5-20% of an admixture comprising 50-90% by weight of the admixture of an alkali-soluble copolymer of a vinyl ester with carboxyl containing monomer copolymerizable therewith and 10-50% by weight of the admixture of a low viscosity water-soluble polymer. Above the maximum 20% solids concentration both the desirable penetration characteristic and the storage stability of the compositions decreases. The pH of the present solutions is 7-9.2. Optionally other agents in moderate proportions may be incorporated to provide even further improvement as indicated in Example 5 above, such other agents including plasticizers and surfactants. The present compositions may be characterized by improved storage stability, depth of penetrability into chalky or crumbly surfaces, adhesion promotion of other surface coatings especially latex and emulsion paints to said surfaces, and water resistance. The products may be characterized as water-thinnable surface coating compositions having improved wetting, penetration, binding and storage stability characteristics. More specifically, these compositions will wet normally hydrophobic surfaces having oily, dirt or chalking oil paint deposits. The excellent penetrability of the compositions provides up to 30 mils penetration through a chalking cement paint film. The compositions will bind a chalking or crumbly surface to provide a firm sub-surface suitable for the reception of a paint top coat.

The air dried films obtained from the present compositions may be characterized by their excellent adhesion, moisture-vapor permeability, water resistance and recoatability. The improved adhesive characteristics of the dried film make it possible to bind chalking or crumbly surface layers to a wide variety of substrates, including concrete, old oil paint and wood. The moisture-vapor permeability of the air dried film is such that surfaces coated with the composition will "breathe" moisture-vapor rather than blister off. The improved water resistance prevents the treated chalking or crumbling layer from losing strength or adhesion even under such severe conditions as total water immersion and/or repeated freeze-thaw cycling. The recoatability of the treated surface permits overcoating with polyvinyl acetate, acrylic, styrene-butadiene latex or emulsion paints as well as with oleoresinous finishes.

The aqueous solutions of the present invention may be applied by the usual methods of brushing, roller coating, spraying, dipping or other known means which will provide a uniform film of the solution on the surface. The wet film can then be air dried or heat cured to provide the water insensitivity and other desirable characteristics heretofore described. As surface conditioner formulations, the solutions may be used in two general ways. For severe surface conditions the solution is applied full strength by the usual methods, preferably brush or spray. For lightly chalked or dirty surfaces, such as commonly encountered over wood, wherein it is desired to apply a latex or emulsion paint film, the solution may be added directly to said paint, using preferably a concentration of 15-60% by volume aqueous solution based on the volume of the latex or emulsion paint. Although it is necessary that the paint to which the present compositions may be added have a pH of 7 or higher for compatibility, it is not believed that the paint composition is otherwise critical and typical paints include those made in accordance with U.S.P. 2,567,678, 2,601,315 and 2,498,712, which patents are hereby incorporated by reference.

Suitable vinyl ester copolymers for the practice of the present invention are well known as indicated by the references thereto in the above examples. Useful copolymers may be characterized as those soluble in water having an alkaline pH but insoluble therein at lower pH values. In order to maintain the improved penetrability of the final solutions containing the alkali-soluble vinyl ester copolymer, it is desirable to select one having a viscosity in alkaline solution at a 20% solution concentration of the copolymer of less than approximately 50 centipoises at 20° C. Useful vinyl esters for the preparation of the copolymers include both aliphatic and aromatic vinyl esters as for example, vinyl acetate, vinyl butyrate, vinyl stearate, vinyl 2-ethyl-hexoate, vinyl benzoate, and mixtures thereof. Vinyl acetate is the preferred vinyl ester not only because of its less expensive raw material cost but also because useful copolymers of the present invention made with vinyl acetate possess greater dimensional stability than those made from other vinyl esters. Suitable monomers for copolymerization with the vinyl ester to form an alkali-soluble copolymer contain a carboxyl group and include crotonic acid, itaconic acid, citraconic acid, mesaconic acid, and substituted products thereof. Partial alkyl esters of ethylenically unsaturated polycarboxylic acids which are copolymerizable with a vinyl ester are also satisfactory comonomers and suitable ones include the monoalkyl esters of maleic acid, fumaric acid, mesaconic acid, and citraconic acid; allyl malonic acid esters; and ethyl aconitic acid esters. Esters of unsaturated monocarboxylic acids are not useful comonomers since alkali-soluble vinyl ester copolymers will not be formed therewith. The useful amount of acid comonomers in the vinyl ester copolymers of the present invention is readily determined as that which will allow at least from about 5-10% aqueous alkaline solutions of the copolymer to be prepared.

Suitable water-soluble polymers for the practice of the present invention may be characterized as those which are water-soluble at temperatures above 100° C. but only slowly soluble therein at lower temperatures. In order to maintain the improved penetrability of the final solutions containing the water-soluble polymer, it is desirable to select a water-soluble polymer having a viscosity for a 4% aqueous solution at 20° C. no greater than 100 centipoises. Useful polyvinyl alcohols are well known and generally formed by the direct hydrolysis of polyvinyl acetate, forming a copolymer type product containing more than 50% hydroxyl groups. The preferred polyvinyl alcohols are available commercially and may be further characterized as having from 0% to approximately 52% residual polyvinyl acetate groups and a viscosity of 1-65 centipoises for a 4% aqueous solution at 20° C. The primary reason for the preference of polyvinyl alcohol is the high relative degree of insensitivity to cold water. Other useful low-viscosity water-soluble polymers can be selected from the class of hydrophilic colloids generally and include carboxymethyl cellulose, sodium methyl cellulose, starches and natural gums.

Plasticizers may be added to the aqueous solutions of the present invention to promote increased flexibility of the dried film. Amounts of plasticizer from 0.5-3.0% by weight of the aqueous solution may be employed with the optimum concentration dependent upon the relative concentration and flexibility of the particular vinyl ester copolymer in the aqueous solution.

As plasticizers there may be employed any of the water dispersible liquid plasticizers for vinyl ester polymers, for example, such organic compounds as phthalate esters, phosphate esters, chlorinated biphenyls and citrate esters. Furthermore, useful organic compounds also include polymeric materials, as for example, non-resinous water-dispersible liquid polyesters. Dibutyl phthalate is a preferred plasticizer primarily because of its relatively lower viscosity compared to other suitable plasticizers which lower viscosity both promotes greater penetrability of the final solution as well as improving the ease of incorporation of the plasticizer into said solution.

Also utilizable with the plasticizers for the purpose of promoting flexibility of the dried polymer film are the well known coalescing agents. The coalescing agents which are useful in the practice of the present invention are water-dispersible organic liquids which are compatible with vinyl ester copolymers. The preferred class of coalescing agents are water-soluble and can be selected from the class of glycols, glycol ethers and esters of glycol ethers including hexylene glycol, ethylene glycol, monoethylether of diethylene glycol, ethylene glycol, monoethylether of propylene glycol, acetic acid ester of ethylene glycol monoethylether and the acetic acid esters of diethylene glycol monobutyl ether. The amount of coalescing agent which may be used in the aqueous solution of the present invention varies from 5-20% by weight of the solution.

Suitable wetting agents may be selected from the group consisting of cationic, anionic and non-ionic surface active agents, which are compatible with a solution of the alkali-soluble vinyl ester copolymer. Preferred surface active agents of the cationic type are the tertiary amines, as for example, ethylene oxide condensation products of the primary fatty amines. Of the anionics, the following are preferred; sulfonsuccinate and the alkyl aryl sulfonates. Preferred non-ionic surface acting agents are the ethylene oxide fatty acid condensates, alkyl aryl polyether alcohols and the polypropylene, glycol-ethylene oxide condensates. Amounts of the wetting agent from 0.5–3% by weight of the aqueous solutions of the present invention may be employed.

It is not intended to limit the use of the present compositions to surface conditioners merely, since it is obvious from the improved properties of these products disclosed above, that the aqueous solutions would make suitable coating and adhesive compositions generally. It is also obvious that additives other than the plasticizers, coalescing agents and wetting agents used, may be added to the present compositions without departing from the spirit and scope of the invention. For example, the present compositions may be pigmented to provide a masonry paint. Corrosion inhibiters may likewise be added to provide protective coatings for metals and other easily oxidizable materials. It is to be understood therefore that the present invention is limited only as defined by the following claims.

What is claimed is:

1. An aqueous alkaline film forming solution comprising 5–20% by weight of the solution of an admixture comprising 50–90% by weight of the admixture of an alkali-soluble copolymer of vinyl acetate with a carboxyl containing monomer copolymerizable therewith and 10–50% by weight of the admixture of a low viscosity polyvinyl alcohol, 0.5–3% by weight of the solution of a water dispersible plasticizer, 5–20% by weight of the solution of a coalescing agent consisting of a high boiling water dispersible liquid compatible with vinyl ester copolymers and 0.5–3% by weight of the solution of a surface active agent.

2. A method for conditioning a dirty, chalking or crumbly surface for coating comprising applying to said surface a film of an aqueous alkaline solution comprising 5–20% by weight of the solution of an admixture comprising 50–90% by weight of the admixture of an alkali-soluble copolymer of vinyl acetate with a carboxyl containing monomer copolymerizable therewith and 10–50% by weight of the admixture of a low viscosity polyvinyl alcohol, 0.5–3% by weight of the solution of a water dispersible plasticizer, 5–20% by weight of the solution of a coalescing agent consisting of a high boiling water dispersible liquid compatible with vinyl ester copolymers and 0.5–3% by weight of the solution of a surface active agent.

References Cited by the Examiner

UNITED STATES PATENTS

| | | | |
|---|---|---|---|
| 2,169,250 | 8/1939 | Izard | 260—29.6 |
| 2,419,880 | 4/1947 | Blyler et al. | 260—29.6 |
| 2,482,237 | 9/1949 | Berglund | 260—29.7 |
| 2,482,931 | 9/1949 | Perkson | 260—29.7 |
| 2,506,537 | 5/1950 | Barnes et al. | 260—29.6 |
| 2,789,903 | 4/1957 | Lukman et al. | 260—29.6 |
| 2,843,505 | 7/1958 | Riedel | 260—29.7 |
| 2,850,471 | 9/1958 | Klein | 260—29.6 |

MURRAY TILLMAN, *Primary Examiner.*

DANIEL ARNOLD, LEON J. BERCOVITZ, *Examiners.*